Dec. 6, 1966     H. HOSKINS     3,290,644
SEISMIC SYSTEMS FOR INVESTIGATING SUBTERRANEAN CONDITIONS
Filed Jan. 3, 1963     3 Sheets-Sheet 1

INVENTOR.
Hartley Hoskins
BY
Attorney

INVENTOR.
Hartley Hoskins

INVENTOR.
Hartley Hoskins
BY
Attorney

United States Patent Office 3,290,644
Patented Dec. 6, 1966

3,290,644
SEISMIC SYSTEMS FOR INVESTIGATING
SUBTERRANEAN CONDITIONS
Hartley Hoskins, Henrietta, N.Y., assignor to the United
States of America as represented by the Secretary of
the Navy
Filed Jan. 3, 1963, Ser. No. 249,301
5 Claims. (Cl. 340—7)

The present invention relates generally to submarine geophysics and more particularly to apparatus for and methods of obtaining seismic reflection and refraction profiles of subterranean structures and terrain.

By analyzing the behavior of sound waves directed toward subterranean structures, seismologists have been able to ascertain the topography of these structures and some of their physical properties. For example, the actual depths and thicknesses of the various subterranean layers can be determined by performing refraction "shooting." In this type of survey at sea, two ships work together, one generating the sound waves and the other serving as the signal receiving means. Usually, the "shooting" vessel, the one producing the sound waves, proceeds along a predetermined course, periodically activating a sound generating device at selected intervals as it proceeds towards the listening ship and beyond it. Hydrophones suspended from the listening ship detect the incoming signals which comprise the direct sound waves which travel through the water on an approximate straight-line basis from the sound generating device to the hydrophones, the reflected waves which bounce once or more off the bottom, and the refracted waves which enter the various suboceanic layers and travel along the interface between them before re-emerging and proceeding to the listening vessel.

By investigating the time of arrival of these different waves and knowing the velocity of sound in water, the velocity of sound through the various layers of the ocean bottom can be found. From this the actual depth and thickness of these different layers can be determined mathematically.

To delineate the possible dip of the interfaces between layers and true velocity of horizontal propagation of the formations, a so-called "reverse" refraction profile is usually made. This requires the "shooting" ship to retrace its former course, close on the listening ship, which is now at the position the "shooting" ship began its first profile, and travel beyond it, while the latter again records the various sound signals arriving at its hydrophones. In this manner the seismic energy propagation in both directions through the structure is measured.

Although refraction shooting does yield valuable data on the above characteristics of the various subterranean layers, it does not, unfortunately, provide the best information as to the finer details of these layers. For this, reflection shooting is employed. Consequently, geologists often perform both refraction and reflection shooting over the same area.

With the apparatus and method of the present invention, a reflection profile and a forward and reverse refraction profile can be made simultaneously from a single vessel traveling over the course at a constant speed. Since the survey can be performed by a single ship, there is no station-keeping problem. Moreover, since a constantly moving ship can maintain its course and speed more accurately than one starting and stopping, both the precision and speed of the survey can be improved.

It is accordingly a primary object of the present invention to provide a method for obtaining oblique seismic reflection and refraction profiles of submarine areas.

A still further object of the present invention is to provide apparatus for ascertaining the topography and propagation velocity of elastic wave energy of subterranean structures wherein the sound energy probing these structures is sent from two spaced sound sources opening and closing range on a receiving point.

A still further object of the present invention is to provide a method for obtaining a reflection profile concurrently with a forward and reverse refraction profile of subterranean structures from a single vessel moving in one direction over the area at a relatively constant speed.

It is another object of the present invention to provide a seismic surveying system employing two sound sources to produce simultaneously a forward and reverse profile of the area being surveyed.

A still further object of the present invention is to provide an arrangement for obtaining simultaneously an oblique forward and reverse reflection and refraction profile of a section of underwater terrain from a single survey vessel.

Other objects, advantages and novel features of the invention will become apparent from the following detailed description of the invention when considered in conjunction with the accompanying drawings wherein:

FIG. 1 schematically illustrates an arrangement for procuring a reflection profile and a forward refraction profile of a subterranean area from a single vessel with the sound source opening range on the receiver location;

FIG. 2 symmetrically illustrates an arrangement for procuring a reflection profile and a reverse refraction profile of a subterranean area from a single vessel with the sound source closing range on the receiver location;

Briefly and in somewhat general terms, the present invention in one preferred embodiment employs a string of detectors equally spaced along a towing cable secured to the survey vessel. At one or both ends of the townig cable a repetitive electromechanical sound generating device is positioned. Each sound source is triggered according to a predetermined schedule. Although all of the detectors continuously receive sound signals, only the output of one particular detector or an affiliated group of detectors is sampled and recorded during any given time interval. This detector is selected such that the recording point in effect always corresponds to a predetermined fixed geographical location. To amplify on this, if the first detector, the one, for example, immediately behind the ship, is sampled when it is over a predetermined position, then the second hydrophone is sampled later on at a time when it has advanced to this same position. Since all of the detectors are equally spaced along the towing line and the ship is proceeding on a straight course at a specified constant speed, the third detector, fourth detector, etc., can be sampled sequentially equal times thereafter when each, in turn, arrives at this same location. When two sound sources are used, the output of each detector is gated so as to be channeled to either a first or second recorder. By correlating the gating of each detector with the triggering time of the different sound sources, one recorder always displays echoes originating from one of these sound sources while the other always displays echoes emanating from the other sound source. By combining the two records, a continuous end-to-end profile can be constructed.

The system of the present invention thus arranges the recording time of the various hydrophones so that one effectively has a geographically fixed receiver with a sound source closing and/or opening range on it. The range opened and closed is established by the length of the cable used. And the number of detectors coupled into the towing cable determine the number of exploratory sound signals that can be sent out during any one profile. Since these detectors also receive reflected signals, the recordings can include a reflection profile, the analysis of which complements the information gleaned from the reversed refraction profiles.

Figure 1:
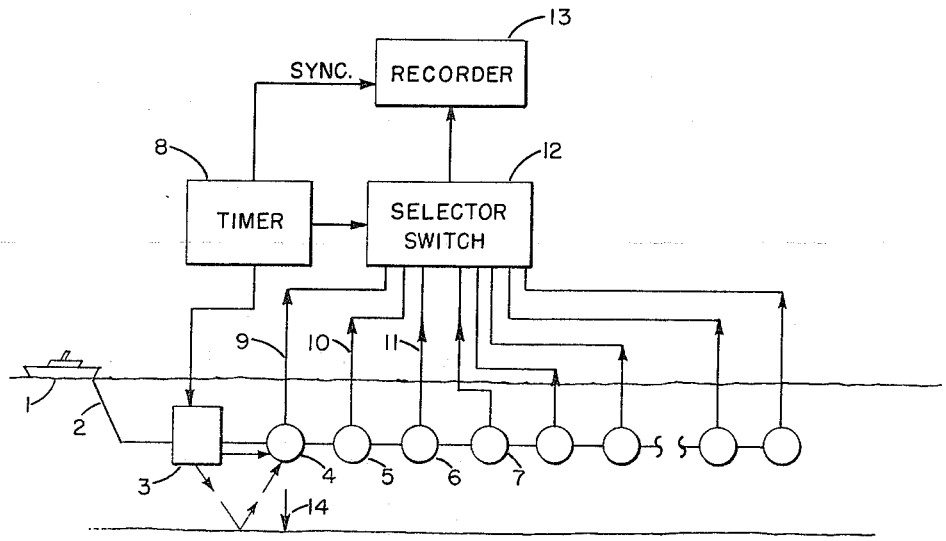

Referring now to FIG. 1, there is schematically illustrated an arrangement for obtaining a forward oblique reflection and refraction profile of a section of underwater terrain from a single survey vessel 1 which makes a single pass over this area at a relatively constant speed. Towed behind this vessel is a cable 2 which has most of its length maintained at a constant depth by a suitable depressor, not shown. Cable 2, it would be pointed out, may be fabricated with an outer armor sheath for strength and protection purposes and include a multiplicity of electrical conductors for the various electrical elements connected thereto. An electrical or an electromechanical sound source 3 of conventional design is positioned immediately behind the survey vessel and, if it is directional, it is orientated so as to have its sound beam transmitted downwardly toward the ocean floor. Also connected to the towing cable and spaced at equal distances therealong are a series of sound receivers 4, 5, 6, 7, etc., orientated to detect sound energy arriving from locations therebelow. The number and spacing of these sound receivers, it would be mentioned, determines the length of the profile which can be made during one cycle of operation of the system.

In the operation of the system, sound source 3 is periodically activated by timer 8, and the signals thereafter detected by the different sound receivers are fed via individual lines 9, 10, 11, etc., to a selector switch 12 which has its single output line coupled to a conventional recorder 13. This recorder may be of the type wherein the timing element takes the form of a rotating helix and the recording is made by a fluctuating electrical current passing between a particular point along this helix and a confronting metallic bar between which the recording paper travels.

The function of selector switch 12, as alluded to hereinbefore, is to couple the output of each sound receiver in turn to recorder 13 as it advances to a particular geographical position, such as, for example, point 14, which is directly below receiver 4, the first one in the chain. To realize this mode of operation, timer 8 and selector switch 12 are mechanically or electrically intercoupled so that the latter advances one step for each activation of the sound source.

At the start of the profile, selector switch 12 is set so that the first sound receiver in the chain, number 4, is coupled to recorder 13. Hence, when sound source 3 is first triggered by timer 8, only those signals detected by this receiver are recorded. The second activation of sound source 3 is timed to take place when sound receiver 5, the second one in the string, advances to the position occupied by receiver 4 when the previous activation took place. Consequently, only those signals arriving at sound receiver 5 are fed by selector switch 12 to recorder 13. Thus, the effective recording location continues to be maintained directly over point 14. When timer 8 activates sound source 3 for the third time, selector switch 12 is again stepped and the output of sound receiver 6 now passes to recorder 13. The above sequence of operations, it will be appreciated, continues until the last sound receiver in the chain is connected to recorder 13.

Figure 4:
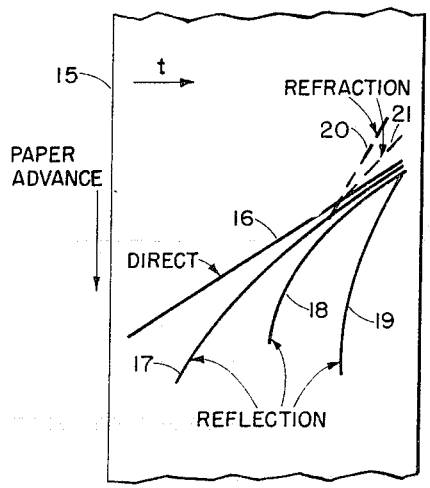
FIG. 4 illustrates a typical recording made by the system of FIG. 1.

From a consideration of what has been said hereinbefore, it will be recognized that the system has a substantially fixed receiver which is over point 14 and operates with a sound source 3, in this case, opening range on it as survey vessel 1 moves in the direction shown. A typical recording produced with the apparatus and method of FIG. 1 is shown in FIG. 4. Here, a length of recording paper 15 contains a linear trace 16 of positive slope indicating the direct sound waves that were propagated on a straight line basis from sound source 3 to the various sound receivers 4, 5, 6, 7, in the chain. The slope of this trace, of course, is established by the rate of paper advance through the recorder as well as the ship's speed and separation between the sound source and the different detectors. This trace in reality consists of a plurality of finite marks corresponding in number to the sound receivers in the chain.

The sound energy reflected from the various subterranean structures appears on the recording paper as traces 17, 18 and 19. These three different traces, as is well known, represent energy arriving at various times after the direct energy because of single reflections from different terrain boundaries or multiple reflection between the ocean bottom and the sea surface. The critically refracted energy is indicated on the recording as dotted traces 20 and 21, for example. Although these signals travel longer paths than the direct or reflected waves, during part of their paths their velocities are greater and, consequently, depending upon the geometry of the system and the characteristics of the terrain and the depth of water, they may arrive before the direct and reflected energy. Since the present invention is concerned solely with the apparatus and methods for obtaining these recordings, a discussion of the various techniques for analyzing these recordings will not be presented herein.

Figure 2:
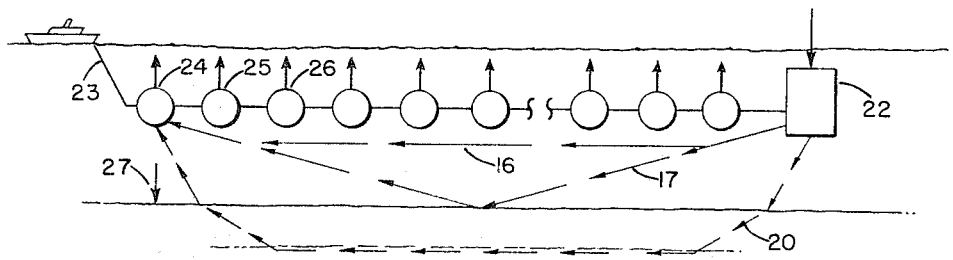

In FIG. 2 there is shown in schematic form an arrangement generally similar to that of FIG. 1 except that the sound source 22 is located at the remote end of the towing cable 23. Here, again, a multiplicity of equally spaced sound receivers 24, 25 and 26 are incorporated into the cable and cooperate with a timer, selector and recorder in the manner of FIG. 1.

In all important details, the operation of this modification is similar to that of FIG. 1, that is, sound source 22 is periodically activated and the outputs of the sound receivers are sequentially coupled one after the other to the recorder. In this case, too, the nearest sound receiver to towing vessel 24 is sampled first, then 25, 26, and so forth, with the recording taking place as each of these elements passes over reference point 27. Thus, the arrangement of FIG. 2, like that of FIG. 1, provides in effect a fixed receiving location with a sound source constantly changing range thereon. However, this range is closing in this modification in contrast to FIG. 1 where it is opening. In FIG. 1 the profile terminates when the last sound receiver in the chain arrives over the recording position. The same is true in FIG. 2.

Figure 5:
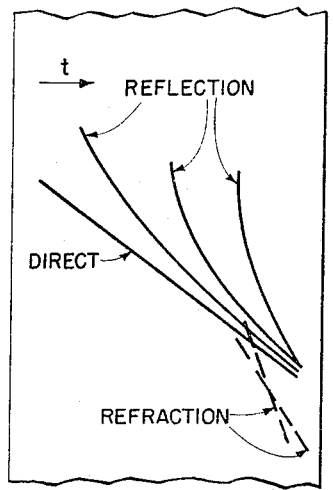
FIG. 5 is a similar recording made with the system of FIG. 2.

A typical recording produced by the arrangement of FIG. 2 is illustrated in FIG. 5, and an inspection of this recording will show the similarity between the various types of traces. However, in this instance, all of the traces have reverse slopes because of the closing range condition.

Figure 3:
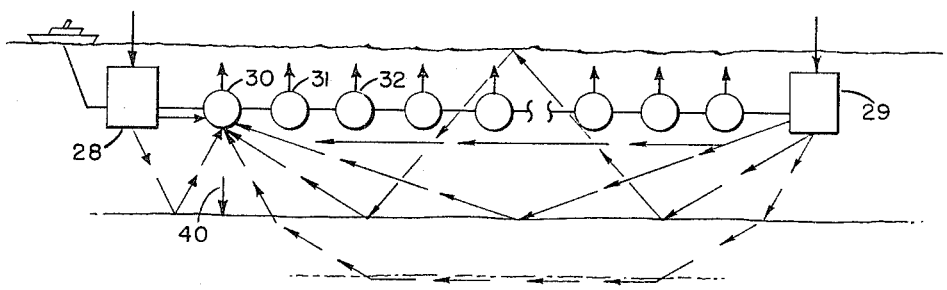
FIG. 3 is an arrangement for obtaining a reflection profile and a forward and reverse refraction profile wherein a pair of sound sources are employed with one closing and the other opening range on the receiver location.

Instead of using only one sound source located either at the beginning or the end of the towing cable, the system can operate to advantage with sound sources at each location. Such an arrangement is schematically depicted in FIG. 3 where sound sources 28 and 29 are integrated with the towing cable to duplicate the functions of sound sources 3 and 22 in FIGS. 1 and 2, respectively. In between the two sources a multiplicity of equally spaced sound detectors 30, 31, 32, etc., are again positioned. With two sound sources, the electrical control apparatus must be modified to insure the separation and isolation of the different signals within the system.

Figure 6:
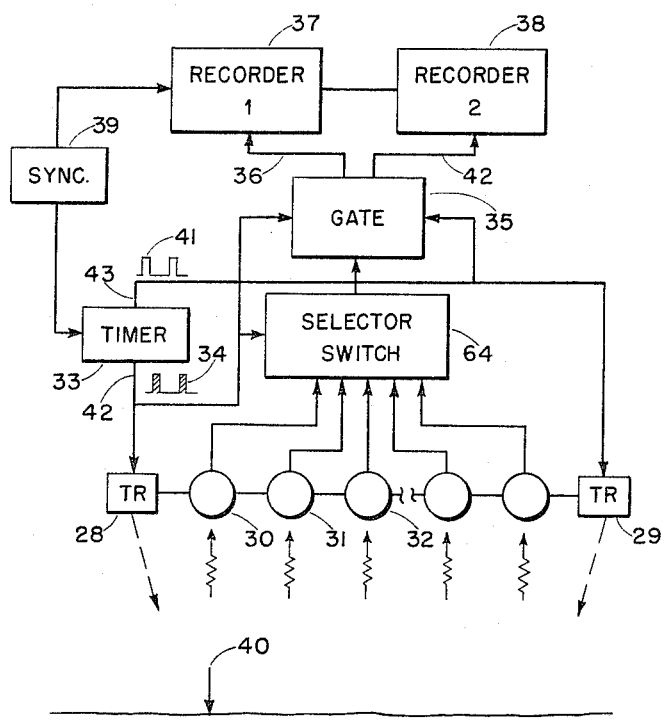
FIG. 6 is a block diagram of the control system of FIG. 3.
Figure 7:
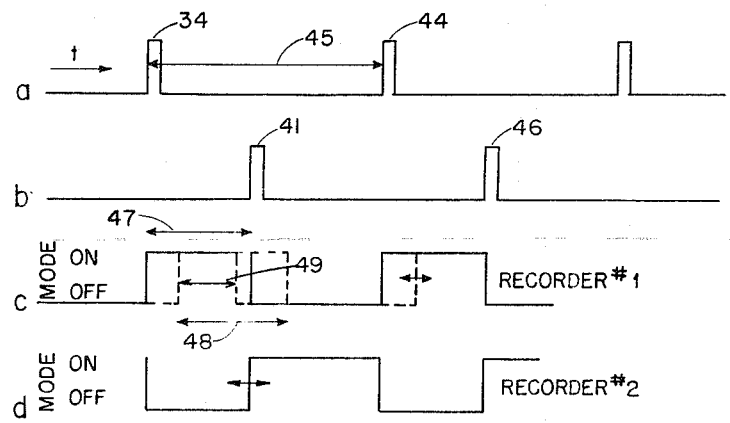
FIG. 7 illustrates the schedule of the keying pulses and the recording intervals of the system of FIG. 3.

The operation of the modification of FIG. 3 can, perhaps, best be comprehended by referring now to FIG. 6 which illustrates in block diagram form the electrical control circuit and FIG. 7 which shows the schedule of the keying pulses and the recording intervals for this system.

Each profile commences with timer 33 sending a trigger pulse 34, line A of FIG. 7, to opening range sound source 28, selector switch 64 and gate 35. In response to this pulse, sound source 28 radiates a first pulse of sound energy, selector switch 64 advances to its first position, and gate 35 opens its output side 36 which is connected to a first recorder 37. Timer 33 is also coupled to this recorder and a companion recorder 38 via a suitable synchronizing apparatus 39, so that both recorders commence operating when timer 33 first becomes activated and stay locked in phase therewith.

During the first recording interval when sound receiver 30 is over position 40, all signals arriving at this detector are channeled via selector switch 64 and gate 35 to recorder 37. The recording on this recorder continues for a specified time which may last until timer 33 generates the second trigger pulse 41 in line B of FIG. 7 or a given time thereafter, depending upon the mode of operation selected. It would be pointed out at this time that timer 33 is constructed with two output circuits 42 and 43 and that alternate trigger pulses appear in each of these circuits. Thus, for example, the first, third, fifth pulses pass into line 42 while the second, fourth and sixth pulses pass into line 43. Pulse 41, the first pulse appearing in line 43, activates closing range sound source 29, the sound source located at the remote end of the cable, and at the same time operates gate 35 to close its output line 36 and open its output line 42 which is connected to recorder 38, the second recorder of the pair. Since selector switch 64 is only stepped by pulses appearing in line 42, sound receiver 30 still remains coupled to gate 35 and, as a result, signals arriving at this detector continue to pass through this switch and gate 35 but now to recorder 38. It will thus be seen that the control circuit functions to direct all the signals derived from sound source 28 to recorder 37 and those from sound source 29 to recorder 38 on a mutually exclusive basis.

The next trigger pulse produced by timer 33 appears in line 42 and is represented by pulse 44 in line A of FIG. 7. Timer 33, it would be mentioned, should be constructed so that the intervals 45, line A, FIG. 7, for example, between consecutive pulses appearing at either line 42 or 43 can be varied to correspond to the time required for a sound source to advance a distance equal to the separation between adjacent sound sources. This permits the survey to be made at different speeds and insures that the recording sound source will be properly positioned when its output is sampled.

Pulse 44 activates sound source 28 for the second time, advances selector switch 64 to its next point and resets gate 35, thereby opening output 36 to recorder 37 and closing output 42 to recorder 38. Since sound receiver 31 is now over location 40, all the signals detected by this apparatus are sent via selector switch 64 and gate 35 to recorder 37. This recorder continues to register the signals arriving at detector 31 until timer 33 generates trigger pulse 46, line B of FIG. 7. This pulse activates sound source 29 a second time and switches the recording operation to recorder 38 by resetting gate 35. The above sequence of events continues until the last sound receiver in the chain arrives at location 40 and has its output recorded first in recorder 37 and then in recorder 38. From an inspection of lines C and D in FIG. 7, it will be seen that recorder 37 registers signals in the time interval between pulse 34 in line A and pulse 41 in line B and that recorder 38 registers signals in the time interval between pulse 41 and the next pulse 44 in line A. Thus, the recording intervals are complementary and mutually exclusive.

It would also be pointed out that the recording interval can be prolonged or shortened or shifted in time as shown in the dotted line to take advantage of the fact that there is a time lapse before the first sound signal arrives at the detector from either one of the sources.

Since there is the possibility of an overlapping interval during which the recording detector receives simultaneously energy initiated at both source because of the depth of the water and the geological structure thereneath, care must be exercised in choosing the ship's speed and, consequently, the pulse repetition rate. In order to maximize the recording presentation, the system should have a capability of locating each recording interval with respect to the various outgoing radiated sound pulses.

Figure 8:
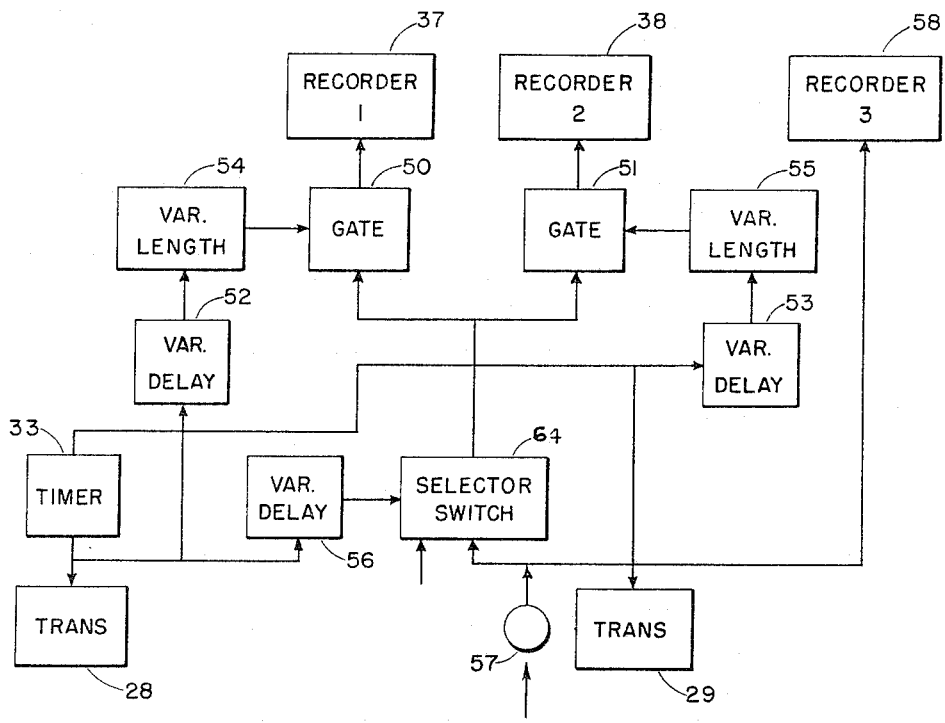
FIG. 8 illustrates a modification of the system of FIG. 6 for shifting the time of occurrence and varying the duration of the recording intervals.

It will be appreciated that the pulse repetition rate of the system, as represented by the time interval 45 in line A of FIG. 7, can be decreased or increased by simply changing the operation of timer 33. To vary the time of occurrence and the duration of the respective recording intervals of the system, the circuit of FIG. 6 can be modified as shown in FIG. 8. The changes involve feeding the output of selector switch 64 to a pair of gates 50 and 51 in the input circuit of recorders 37 and 38, respectively. These gates, which are normally closed, are opened sequentially for variable lengths of time by pulses originating at timer 33 and fed thereto via variable delay circuits 52 and 53 and shaping circuits 54 and 55 which impart to these pulses different lengths, depending upon the duration of receiving intervals desired. It will be appreciated that the settings of variable delay circuits 52 and 53 determine the commencement of the recording intervals with respect to the transmission times and that the operation of pulse-shaping circuits 54 and 55 determine the termination of these intervals. Additionally, a variable delay circuit 56 is included in the system to permit selector switch 64 to be stepped different times after each activation of transmitter 28. Thus, instead of recorder 37 registering incoming signals for the interval 47 in line C of FIG. 7, this recording period can be modified both in time and duration in the schedule to correspond to the interval 48 or 49 in the same line.

As mentioned hereinbefore, the systems of FIGS. 1, 2 and 3 can provide simultaneously with the forward and reverse refraction profiles a continuous reflection profile by coupling the output of the first or trailing receiver, for example, in the chain directly to a separate recorder, bypassing the selector switch and the gate employed in the refraction portion of the apparatus. In the FIG. 8, the last sound receiver in the chain, element 57, is connected to a third recorder 58 as well as to selector switch 64 for this particular purpose. This additional concurrent reflection profile, it will be appreciated, gives the investigator a greater amount of information with which to make an interpretation. In order to simplify the above description, it was conveniently assumed that each sound receiver was sampled only when it was over a particular geographical location. However, it will be appreciated that in actual practice each receiver travels a finite distance during the time its output is being recorded because of the constant movement of the towing vessel.

Despite the advantages of having the survey vessel travel at a constant speed over the course, this vessel, if desired, can be stopped intermittently to decrease the movement of the receivers during the recording intervals. Likewise, the towing cable may be slacked off at appropriate times to accomplish the same result.

Since the traces representing the refracted signals are generally of lower intensity, a difference in amplifier gain may be introduced at the time of the direct arrival so as to further the presentation of these signals by compensating for their difference in intensity.

In the above systems a single sound detector was shown at each of the various locations along the cable. However, it will be appreciated that a multiplicity or array of such detectors can be employed at each of the above sites. Each group, as is well known, would serve effectively as a single detector of greater dynamic range and better directionality than the one employed for illustrative purposes hereinbefore.

The output of the detector string supplied to selector switch 64, FIG. 6, can also be connected directly into a conventional multichannel reflection seismograph recorder for that operation.

Obviously many modifications and variations of the present invention are possible in the light of the above teachings. It is therefore to be understood that within the scope of the appended claims the invention may be practiced otherwise than as specifically described.

What is claimed is:

1. In a system for obtaining simultaneously a forward and reverse seismic profile of a subterranean location,
a first and second sound source;
a multiplicity of sound receivers equally spaced therebetween;
means for moving said sound sources and said sound receivers over said location;
means for activating said first sound source at times $t_1$, $t_3$, $t_5$, etc., and said second sound source at times $t_2$, $t_4$, $t_6$, etc.;
a selector switch having a plurality of input circuits and a single output circuit;
a first and second recorder;
means for coupling each of said sound receivers to a different input circuit of said selector switch;
means for advantaging said selector switch at times $t_1$, $t_3$, $t_5$, etc., to different positions thereby to connect each of said input circuits to said output circuit;
and means for coupling the output circuit of said selector switch to said first and second recorders during mutually exclusive time intervals whereby said first recorder registers sound pulses originating at said first sound source and said second recorder registers sound pulses originating at said second sound source.

2. In an arrangement as defined in claim 1,
a third recorder;
and means for connecting one of said sound receivers directly to said third recorder whereby said third recorder continuously registers sound pulses arriving at said last-mentioned sound receiver.

3. In an arrangement as defined in claim 1,
means for varying the duration of the mutually exclusive time intervals during which the output circuit of said selector switch is coupled to said first and second recorders.

4. In a seismic surveying system for obtaining simultaneously a forward and reverse seismic profile of a subterranean location,
a first and second sound source;
a series of equally spaced sound receivers disposed therebetween;
means for moving said sound sources and said sound receivers at the same speed over said location;
a timer for producing pulses at a predetermined pulse repetition rate;
means for connecting said timer to said first and second sound sources such that said first sound source is activated by the odd numbered pulses and said second sound source is activated by the even numbered pulses produced by said timer;
a selector switch having a multiplicity of input circuits corresponding to the number of sound receivers in said series and a single output circuit which is adapted to be sequentially coupled to the individual input circuits of said selector switch as said selector switch is advanced;
means for coupling the odd pulses generated by said timer to advance said selector switch;
a gate circuit having an input and two output circuits, said gate in a first condition having its input circuit connected to its first output circuit and in a second condition having its input circuit connected to its second output circuit;
a first and second recorder, said first recorder being connected to the first output circuit of said gate and said second recorder being connected to the second output circuit of said gate;
means for connecting the output circuit of said selector switch to the input circuit of said gate;
and means for alternately switching said gate to its first and second condition.

5. In an arrangement as defined in claim 4 wherein said gate is switched to its first condition by the odd numbered pulses generated by said timer and to said second condition by the even pulses generated by said timer.

References Cited by the Examiner

UNITED STATES PATENTS

| | | | |
|---|---|---|---|
| 2,620,890 | 12/1952 | Lee et al. | 181—.5 |
| 2,729,300 | 1/1956 | Pasley et al. | 181—.5 |
| 3,105,568 | 10/1963 | Jolly | 181—.5 |
| 3,189,870 | 6/1965 | Roever | 340—7 |

BENJAMIN A. BORCHELT, *Primary Examiner.*

P. A. SHANLEY, *Assistant Examiner.*